United States Patent [19]

Langdon

[11] 4,189,609

[45] Feb. 19, 1980

[54] MULTI-BLOCK COUPLED POLYOXYALKYLENE COPOLYMER SURFACTANTS

[75] Inventor: William K. Langdon, Grosse Ile, Mich.

[73] Assignee: BASF Wyandotte Corporation, Wyandotte, Mich.

[21] Appl. No.: 855,598

[22] Filed: Nov. 28, 1977

Related U.S. Application Data

[60] Division of Ser. No. 654,268, Feb. 2, 1976, Pat. No. 4,072,704, which is a continuation-in-part of Ser. No. 498,670, Aug. 19, 1974, abandoned.

[51] Int. Cl.² .................. C07C 43/30; C07C 43/32
[52] U.S. Cl. .................................... 568/601; 568/603
[58] Field of Search ................... 260/615 A; 568/601, 568/603

[56] References Cited

U.S. PATENT DOCUMENTS

| | | | |
|---|---|---|---|
| 2,535,458 | 12/1950 | Robeson | 260/615 A |
| 2,785,949 | 3/1957 | Kress | 260/615 A |
| 2,785,995 | 3/1957 | Kress | 260/615 A |
| 2,786,081 | 3/1957 | Kress | 260/615 A |
| 2,796,401 | 6/1957 | Matuszak et al. | 260/615 A X |
| 2,796,423 | 6/1957 | Cottle et al. | 260/615 A |
| 2,838,573 | 6/1958 | Matuszak et al. | 260/615 A |
| 2,878,294 | 3/1959 | Kress | 260/615 A |
| 3,382,176 | 5/1968 | Jakobi et al. | 260/615 A X |
| 3,931,337 | 1/1976 | Langdon | 260/615 A |

*Primary Examiner*—Howard T. Mars
*Attorney, Agent, or Firm*—Bernhard R. Swick; Norbert M. Lisicki

[57] ABSTRACT

Multi-block coupled polyoxyalkylene copolymer surfactants are prepared from individual blocks of polymers and copolymers of alkylene oxides by reacting these with bifunctional compounds to form polycarbonate esters and polyformals.

2 Claims, No Drawings

MULTI-BLOCK COUPLED POLYOXYALKYLENE COPOLYMER SURFACTANTS

This application is a division of application Ser. No. 654,268, filed Feb. 2, 1976 now U.S. Pat. No. 4,072,704 which is a continuation-in-part of application Ser. No. 498,670, filed Aug. 19, 1974, now abandoned.

BACKGROUND OF THE INVENTION

1. Field of the Invention

The present invention relates to polyformal and polycarbonate copolymers which are useful as surfactants. More specifically, individual blocks of polymers and copolymers of alkylene oxides are reacted with either a lower dialkyl carbonate or formaldehyde to form blocks linked by formal or carbonate groups.

2. Prior Art

Surface active multi-block polyoxyalkylene copolymers are well known in the art. This is evidenced by the teachings of U.S. Pat. No. 2,950,310 wherein esters are produced from polyoxyalkylene glycols, dibasic acids and monohydric alcohols. The dibasic acids contain from 2 to 12 carbons. There is no teaching of the particular surface active compounds of this invention. The coupling compounds employed in the present invention contain only one carbon atom. Further, there is no teaching of the use of multi-block coupling such as taught by the present invention.

U.S. Pat. No. 2,905,719 teaches the preparation of surface active formals whereby an alkyl group is linked to a polyoxyethylene group through a formal linkage. There is no teaching of the use of multiple formal linkages joining multi-block polyoxyalkylene groups. Further, the present invention does not link an alkyl group to a polyoxyalkylene group. The present invention is directed to linking blocks of polyoxyalkylene groups to one another.

SUMMARY OF THE INVENTION

It has been discovered that surface active compounds may be prepared by linking polyoxyethylene and polyoxypropylene polymers through the use of coupling agents such as formaldehyde or a dialkyl carbonate. The blocks of hydrophobic and hydrophilic polymers are reacted with a dialkyl carbonate in the presence of an alkaline catalyst. Subjecting the mixture to heat and distilling off an alkanol results in an ester exchange which effectively links the hydrophobic and hydrophilic blocks together. The blocks of hydrophobic and hydrophilic polymers may also be linked through the use of formaldehyde. Formaldehyde is added to a mixture of the hydrophobic and hydrophilic block polymers in the presence of an acid catalyst. The water, which results from the reaction of formaldehyde with the hydroxyl terminated block polymers, is removed by an azeotropic distillation with a water immiscible solvent such as benzene.

The various polyoxyethylene or polyoxypropylene polymers can be pre-reacted to form blocks of varying structure and molecular weight. For example, it is possible to link several polyoxypropylene groups of about 400 molecular weight using a dialkyl carbonate or formaldehyde. Similar linkages can be obtained from polyoxyethylene groups. These blocks can then be linked together, again employing either a dialkyl carbonate or formaldehyde, to form any desired hydrophobic or hydrophilic ratio. It is generally well known that polyoxyalkylene blocks of molecular weights below 900 exhibit poor detergency properties as taught by U.S. Pat. No. 2,674,619. Thus, it is surprising that these short hydrophilic and hydrophobic blocks coupled by polyformal or polycarbonate linkages would display such high surface activity. It is further surprising that short random block hydrophilic and hydrophobic copolymers exhibit surface activity.

DESCRIPTION OF THE PREFERRED EMBODIMENT

In accordance with this invention polyoxyalkylene polymers are coupled by a reaction with either a dialkyl carbonate or formaldehyde. The preparation of a product formed by coupling with a dialkyl carbonate is exemplified by the following equations:

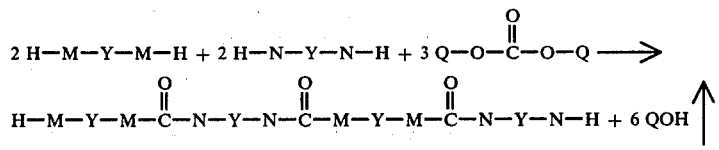

where
Y is the residue of an alkylene glycol containing therein two terminal hydroxyl groups, minus the terminal hydrogen atoms, M is a hydrophilic chain of units selected from the group consisting of oxyethylene and oxyethylene-oxypropylene units wherein the oxyethylene content of said hydrophilic chain is from about 75 and 100 weight percent and the oxypropylene content is from 0 to about 25 weight percent, the number of oxyethylene and oxypropylene groups in M being from about 2 to about 15, N is a hydrophobic chain of units selected from the group consisting of oxypropylene units and oxyethylene-oxypropylene units wherein the oxypropylene content is from about 75 to 100 weight percent and the oxyethylene content is from 0 to about 25 weight percent, the number of oxyethylene and oxypropylene groups in N being from about 2 to about 10, Q is selected from the group consisting of methyl, ethyl and propyl.

The above product will probably also contain species which are terminated with an alkyl carbonate group rather than hydroxyl groups similar to the following formula:

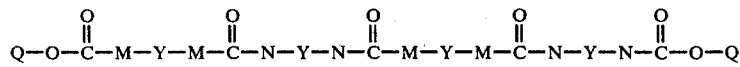

wherein Q, Y, and N are as defined above. If the molar quantities of dialkyl carbonate appreciably exceed those of the oxyethylene and oxypropylene units then the alkyl carbonate terminated species will predominate. Generally, for every mole of oxyalkylene units, 0.5 to about 1.0 mole of alkyl carbonate is required to form the hydroxy terminated products. This is due to the volatility of the alkyl carbonates. Molar ratios greater than 1 mole of alkyl carbonate to 1 mole of oxyalkylene unit, preferably 1.25 to 2 of alkyl carbonate to 1 mole of oxyalkylene unit are required to form a compound which is predominantly terminated with the alkyl carbonate. The coupling reaction with the dialkyl carbonate is carried out at a temperature range of about 100° to 200° C. in the presence of an alkaline catalyst. Examples of such catalysts are sodium carbonate, potassium carbonate, sodium methoxide, sodium ethoxide, potassium methoxide and potassium ethoxide, sodium hydroxide, potassium hydroxide and mixtures thereof. The preferred alkaline catalyst is potassium carbonate. The amount of catalyst employed may vary from about 0.01 to about 1 weight percent based on the total weight of reactants. The amount of alkaline catalyst is not critical, however it is necessary that the coupling reaction with the dialkyl carbonate occur at an alkaline pH. The pH may vary from 8 to 11, preferably from 8 to 10. The reaction with dialkyl carbonate occurs as the result of an ester interchange. As the temperature is raised from 100° to 200° C. an alkanol is distilled off resulting in the ester interchange. This results in the coupling of oxyalkylene groups through the carbonate groups.

The preparation of a product formed by coupling with formaldehyde is exemplified by the following equations:

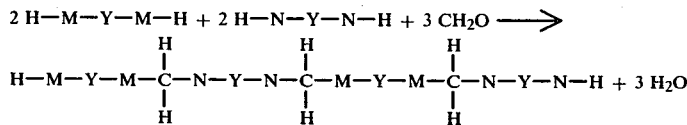

This product will also probably contain species which are terminated with a methylol group rather than hydroxyl groups similar to the following formula:

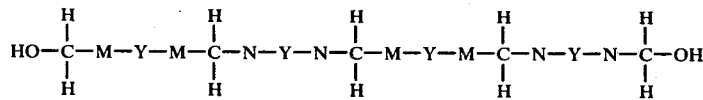

wherein Y, M, and N are defined as above. A mole ratio of 0.5 to about 1.0 of formaldehyde to 1.0 mole of oxyalkylene unit results in the preponderant formation of the hydroxy terminated species. This is due to the volatility of the formaldehyde. Mole ratios greater than 1 mole of formaldehyde to 1 mole of oxyalkylene unit, preferably 1.25 to 2.0 moles of formaldehyde to 1 mole of oxyalkylene unit, are required to form a compound which is predominantly terminated with methylol groups.

The compounds prepared by coupling the polyoxyalkylene condensation products with formaldehyde are carried out at a temperature range of about 25° C. to 150° C. in the presence of an acid catalyst. Examples of such catalysts are sulfuric acid, hydrochloric acid, hydrobromic acid, p-toluene sulfonic acid, phosphoric acid, trifluoroacetic acid, methane sulfonic acid and trichloroacetic acid. The preferred catalyst is sulfuric acid. The amount of catalyst employed may vary from 0.01 to about 3 weight percent based on the total weight of reactants. The coupling reaction is carried out in the presence of a water immiscible solvent which is employed to remove the water of reaction by an azeotropic distillation. Examples of such solvents are benzene, toluene, xylene, hexane and cyclohexane.

The pH of the reaction may vary from about 2 to about 6, preferably from 3 to 6.

The polyoxyalkylene polymers are prepared by reacting the alkylene oxide with a base compound containing a plurality of active hydrogen atoms. The base compounds preferably have molecular weights of less than 100.

The term "active hydrogen atom" is well known to those skilled in the art. It is sufficiently labile to react with ethylene, propylene or butylene oxide and it reacts with methyl magnesium iodide, liberating methane according to the classical Zerewitinoff reaction. The active hydrogen atoms are normally activated by being members of a functional group such as a hydroxyl group, a phenol group, a carboxylic acid group, a basic nitrogen group such as an amine group, a hydrazine group, an imine group or an amide group. Active hydrogen atoms may also be activated by proximity to carbonyl groups such as acetoacetic ester. Examples of active hydrogen compounds, which may be used as base compounds, include ethylene glycol, diethylene glycol, propylene glycol, dipropylene glycol, butylene glycol, amylene glycol, hexylene glycol, heptylene glycol and octylene glycol.

The alkylene oxides which may be employed are ethylene oxide, as the source for the hydrophile and propylene and butylene oxides as the source for the hydrophobes. Those preferred are ethylene oxide and propylene oxide.

The individual polyoxyalkylene polymers and copolymers may have a molecular weight ranging from 200 to 2000 preferably from 200 to 1000. If desired, heteric polyoxyethylene polyoxypropylene polymers may also be employed.

The polyoxyalkylene polymers and copolymers employed in this invention are generally prepared by carrying out the condensation reaction of the alkylene oxide with the base compound in the presence of an alkaline catalyst in a manner well known to those skilled in the art. Any of the types of catalysts commonly used for alkylene oxide condensation reactions may be employed. Catalysts which may be employed include sodium hydroxide, potassium hydroxide, sodium methylate, sodium ethylate, potassium acetate, sodium acetate, trimethylamine and triethylamine. After the condensation reaction is completed, the catalyst may be removed from the reaction mixture by any known procedure such as neutralization, filtration or ion exchange. The condensation is preferably carried out at elevated temperatures and pressures. The condensation products are then subjected to the coupling reaction to form the products of the invention.

The products of this invention can be exemplified by the following formula:

H—R—Y—R[Z—M—Y—M]$_a$[Z—N—Y—N]$_b$Z—R—Y—R—H wherein

Z is selected from the group consisting of (—CH$_2$) and $$(-\overset{\overset{\displaystyle O}{\|}}{C})$$

Y is the residue of an alkylene glycol containing therein two terminal hydroxyl group, minus the terminal hydrogen atoms, M is a hydrophilic chain of units selected from the group consisting of oxyethylene or a mixture of oxyethylene and oxypropylene units wherein the oxyethylene content is from about 75 to 100 weight percent and the oxypropylene content is from about 0 to about 25 weight percent, the total number of oxyethylene and oxypropylene units in M being from about 2 to about 15, N is an oxypropylene group or a mixture of oxyethylene and oxypropylene groups wherein the oxypropylene content is from about 75 to 100 weight percent and the oxyethylene content is from 0 to about 25 weight percent, the number of oxyethylene and oxypropylene groups in N being from about 2 to about 10, wherein

[Z—M—Y—M]

and

[Z—N—Y—N]

are linked together either in a random or an ordered manner,

R is M or N, and a and b are integers from 2 to 20 in a ratio between 1:9 to 9:1.

It is to be understood that the above formulae as used in the specification and claims are generalized formulae and do not represent only a single block of polyoxypropylene groups and a single block of polyoxyethylene groups but, on the contrary, the compounds of this invention may be either of a random block variety or an ordered block type which may have considerably more than two blocks. Random block surfactants are generally prepared by reacting, for example, a mixture of oxyethylene and oxypropylene polymers and copolymers with either formaldehyde or dialkyl carbonate. The reaction is continued, when a dialkyl carbonate is used, at a temperature of 150° C. An alkanol is distilled off while the temperature is gradually raised to about 200° C. If formaldehyde is used as the linking agent, the mixture of oxypropylene and oxyethylene polymers is reacted with formaldehyde and water is removed by azeotropic distillation with a solvent such as benzene at a temperature between 75° and 100° C. Optionally, random block surfactants may be prepared by forming the linked blocks of oxypropylene and oxyethylene individually and then blending them together for a final linking process with either formaldehyde or a dialkyl carbonate.

Ordered block surfactants are prepared by reacting an oxypropylene polymer and an oxyethylene polymer individually with either a dialkyl carbonate or formaldehyde to form a linked oxypropylene or oxyethylene copolymer block. These linked copolymer blocks are then blended together in the amounts required to achieve the desired balance of hydrophilic and hydrophobic units. This blend is then further subjected to a linking process, as described above, wherein either formaldehyde or a dialkyl carbonate were used as the linking agent.

The time required for the above reactions is generally not a critical factor but will vary with the concentration of reactants and the reaction temperatures. Thus, the time can vary from about 15 minutes to about 10 hours in each case. From an economic point of view, however, it is impractical to continue any reaction for more than ten hours. Generally, the reactions are completed within five hours. Thus it is possible to form a surfactant composed of low molecular weight hydrophilic and hydrophobic units coupled either through formal groups or carbonate groups as shown by the following formula:

H—M—Y—M—Z—N—Y—N—Z—M—Y—M—Z—N—Y—N—Z—M—Y—N—H and

H—N—Y—N—Z—N—Y—N—Z—M—Y—M—Z—M—Y—M—Z—N—Y—N—Z—N—Y—N—H where Y, M, N, and Z are as defined above.

This unique structure of the formal or carbonate linked multi-block copolymers results in surfactants which are useful for a number of applications. They may be used as biodegradable or quasi-biodegradable surfactants. These molecules fragment into the individual polyoxyalkylene glycols either biologically or hydrolytically under either slightly acidic or basic conditions. They are useful as anti-foaming agents and as surfactants where very low foam is required. These surfactants may also be used in rewetting paper pulp for the manufacture of paper. They may be used as surfactants or lubricants in textile applications in which removal of the surfactant or lubricant is required before subsequent processing steps are carried out. Removal can be readily accomplished by passing the textile material through a slightly acidic or basic treating bath.

The following examples illustrate the invention. All parts are by weight unless otherwise stated.

EXAMPLE 1

Preparation of polycarbonate copolymer

A clean, dry, 1 liter distilling flask equipped with fractionating column and distillation head was charged with 250 grams of polyethylene glycol, molecular weight 400, 250 grams of polypropylene glycol, molecular weight 435, 159 grams of diethyl carbonate and 0.5 gram of potassium carbonate. The mixture was heated to 150° C. After allowing the temperature to remain at this point for thirty minutes, the pot temperature was gradually raised to 200° C. At the same time ethanol was removed. The flask contents were cooled to 110° C. The volatiles were then distilled off at a pot temperature of 150° C. at 10 millimeters of mercury pressure. The weight of the product obtained was 538 grams. The vacuum strippings were found to be approximately 50 percent ethanol and 50 percent diethyl carbonate. The amount of recovered ethanol corresponds to a coupling of eight polyethylene glycol and polypropylene glycol units corresponding to a molecular weight of approximately 3200.

EXAMPLE 2

A clean, dry, 1 liter distilling flask equipped with fractionating column and distillation head was charged with 300 grams of polyethylene glycol, molecular weight 600, 300 grams of polypropylene glycol, molecular weight 800, 126 grams of diethyl carbonate, 0.6 gram of potassium carbonate and 1 gram of 20 percent potassium hydroxide in methanol. The reaction was allowed to proceed as in Example 1. The amount of recovered volatiles was 76 grams of ethanol and 22 grams of diethyl carbonate. The weight of product obtained was 627 grams.

EXAMPLE 3

Preparation of a polyformal copolymer

A clean, dry, 1 liter flask equipped with a stirrer, reflux condenser, Dean Starke water separator, thermometer and nitrogen inlet was charged with 250 grams of polyethylene glycol, molecular weight 400, 250 grams of polypropylene glycol, molecular weight 434, 72 grams of paraformaldehyde, 1.1 mls. of concentrated sulfuric acid and 200 mls. of benzene. The temperature of the mixture was raised from 25° to 90° C. and 24.6 grams of water was removed by azeotropic distillation with benzene. The residual benzene was then removed by distillation at a pot temperature of 125° C. at atmospheric pressure and the product was finally stripped at 120° C. at 2 millimeters of mercury pressure. The amount of product obtained was 520 grams.

EXAMPLE 4

A clean, dry, 1 liter flask equipped with a stirrer, reflux condenser, Dean Starke water separator, thermometer and nitrogen inlet was charged with 250 grams of polyethylene glycol, molecular weight 588 and 250 grams of polypropylene glycol, molecular weight 800, 24.6 grams of paraformaldehyde, 1 milliliter of concentrated sulfuric acid and 200 milliliters of benzene. The temperature of the mixture was raised from 25° C. to 90° C. and 14.4 grams of water was removed by azeotropic distillation with benzene. The residual benzene was then removed by distillation as described in Example 3. The product obtained weighed 517 grams.

The Table illustrates the properties of the compounds obtained from the above Examples.

TABLE

| Example | Surfactant Properties | | | |
|---|---|---|---|---|
| | 1 | 2 | 3 | 4 |
| Cloud Point, 1% Solution, °C. | 45–49 | 28–31 | 46–50 | 63–69 |
| Surface Tension, 1% Solution, 25° C., dynes/cm | 37.1 | 35.1 | 41.7 | 38.4 |
| Draves Sink time, 3 g. hook, 0.1% Solution, 25° C., sec. | 44 | 52 | 276 | 62 |
| Dynamic Foam* 400 ml/min. | | | | |
| at 77° F. | 9/4 | 36/25 | 40/4 | 20/12 |
| at 120° F. | 0/0 | 25/6 | 25/6 | 65/16 |

*The procedure and apparatus used for the dynamic foam measurements may be found in "Soap and Chemical Specialties" 37, 55, April 1961.
This Table illustrates both the excellent wettability of these surfactants and their low foaming properties.

The embodiments of the invention in which an exclusive property or privilege is claimed are defined as follows:

1. A polyformal compound having the formula

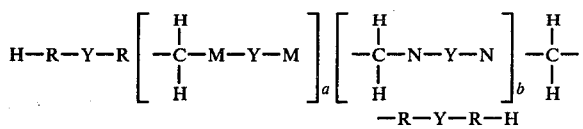

wherein
Y is the residue of an ethylene glycol or propylene glycol minus the terminal hydrogen atoms,
M is a hydrophilic chain of units selected from the group consisting of oxyethylene and oxyethylene-oxypropylene units wherein the oxyethylene content of said hydrophilic chain is from about 75 to 100 weight percent and the oxypropylene content is from 0 to about 25 weight percent, the number of oxyethylene and oxypropylene groups in M being from about 2 to about 15,
N is a hydrophobic chain of units selected from the group consisting of oxypropylene units and oxyethylene-oxypropylene units wherein the oxypropylene content is from about 75 to 100 weight percent and the oxyethylene content is from 0 to about 25 weight percent, the number of oxyethylene and oxypropylene groups in N being from about 2 to about 10, wherein

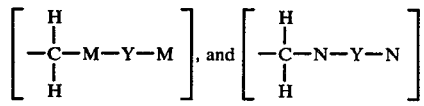

are linked together either in a random or an ordered manner,
R is M or N, and
a and b are integers from 2 to 20 in a ratio between 1:9 to 9:1.

2. A polyformal compound having the formula

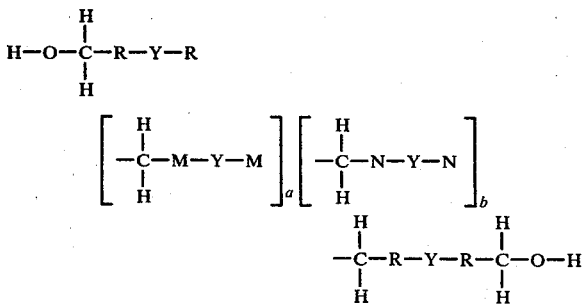

wherein
Y is the residue of an ethylene glycol or propylene glycol containing therein two terminal hydroxyl groups minus the terminal hydrogen atoms, M is a hydrophilic chain of units selected from the group consisting of oxyethylene and oxyethylene-oxypropylene units wherein the oxyethylene content of said hydrophilic chain is from about 75 to 100 weight percent and the oxypropylene content is from 0 to about 25 weight percent, the number of oxyethylene and oxypropylene groups in M being from about 2 to about 15, N is a hydrophobic chain of units selected from the group consisting of oxypropylene units and oxyethylene-oxyproylene units wherein the oxypropylene content is from about 75 to 100 weight percent and the oxyethylene content is from 0 to 25 weight percent, the number of oxyethylene and oxypropylene groups in N being from about 2 to about 10, wherein $$\left[\begin{array}{c} H \\ | \\ -C-M-Y-M \\ | \\ H \end{array}\right], \text{ and } \left[\begin{array}{c} H \\ | \\ -C-N-Y-N \\ | \\ H \end{array}\right]$$

are linked together either in a random or an ordered number,

R is M or N, and a and b are integers from 2 to 20 in a ratio between 1:9 to 9:1.

* * * * *